(12) United States Patent
Suzuki et al.

(10) Patent No.: US 11,009,092 B2
(45) Date of Patent: May 18, 2021

(54) FRICTION MATERIAL

(71) Applicant: ADVICS CO., LTD., Kariya (JP)

(72) Inventors: Shusuke Suzuki, Nagakute (JP); Naoki Odani, Nagoya (JP); Masaaki Kobayashi, Obu (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 16/633,802

(22) PCT Filed: Jul. 23, 2018

(86) PCT No.: PCT/JP2018/027508
§ 371 (c)(1),
(2) Date: Jan. 24, 2020

(87) PCT Pub. No.: WO2019/022011
PCT Pub. Date: Jan. 31, 2019

(65) Prior Publication Data
US 2020/0208699 A1   Jul. 2, 2020

(30) Foreign Application Priority Data

Jul. 25, 2017   (JP) .............................. JP2017-143200

(51) Int. Cl.
*F16D 69/02* (2006.01)
*C09K 3/14* (2006.01)
*B29K 507/04* (2006.01)

(52) U.S. Cl.
CPC ............ *F16D 69/026* (2013.01); *C09K 3/149* (2013.01); *B29K 2507/04* (2013.01); *F16D 2200/0069* (2013.01); *F16D 2200/0073* (2013.01); *Y10T 428/258* (2015.01)

(58) Field of Classification Search
CPC .......... F16D 69/026; F16D 2200/0073; F16D 2200/0069; C09K 3/149; Y10T 428/258; B29K 2507/04
USPC ......................................................... 523/156
See application file for complete search history.

(56) References Cited

U.S. PATENT DOCUMENTS

| 2003/0049427 A1* | 3/2003 | Tadokoro .............. F16D 69/026 |
| | | 428/292.1 |
| 2003/0064217 A1* | 4/2003 | Tsugawa ............... F16D 69/026 |
| | | 428/328 |
| 2017/0082168 A1* | 3/2017 | Kesavan ............... F16D 69/025 |

FOREIGN PATENT DOCUMENTS

| JP | 11-61105 A | 3/1999 |
| JP | 2012-255052 A | 12/2012 |

OTHER PUBLICATIONS

International Search Report dated Aug. 28, 2018 in PCT/JP2018/027508 filed on Jul. 23, 2018, citing document AO therein, 2 pages.

* cited by examiner

*Primary Examiner* — Doris L Lee
(74) *Attorney, Agent, or Firm* — Oblon, McClelland, Maier & Neustadt, L.L.P.

(57) ABSTRACT

A friction material which comprises a fibrous base, a binder, a lubricating material, an organic filler, and an inorganic filler, the friction material having a copper element content of 0.5 wt % or less with respect to the whole friction material, wherein the lubricating material comprises graphite having an average particle diameter of 10.0 μm or smaller and the inorganic filler includes barium sulfate, which comprises small-diameter barium sulfate having an average particle diameter of 1.5 μm or smaller and a purity of 95.0% or higher.

8 Claims, 2 Drawing Sheets

| | | | | EXAMPLE | | | | | | COMPARATIVE EXAMPLE | | | |
|---|---|---|---|---|---|---|---|---|---|---|---|---|---|
| | | | | 1 | 2 | 3 | 4 | 5 | 6 | 1 | 2 | 3 | 4 |
| COMPOSITION (wt%) | BINDER | PHENOLIC RESIN | | 9 | 9 | 9 | 9 | 9 | 9 | 9 | 9 | 9 | 9 |
| | FIBROUS BASE | ARAMID FIBER | | 3 | 3 | 3 | 3 | 3 | 3 | 3 | 3 | 3 | 3 |
| | | INORGANIC FIBER | | 7 | 6 | 7 | 6 | 6 | 6 | 6 | 7 | 6 | 6 |
| | ORGANIC FILLER | CASHEW DUST | | 7 | 7 | 7 | 7 | 7 | 7 | 7 | 7 | 7 | 7 |
| | LUBRICATING MATERIAL | GRAPHITE | AVERAGE PARTICLE DIAMETER 2 μm | 6 | 6 | 6 | 6 | 6 | 6 | 6 | 6 | 6 | 6 |
| | | | AVERAGE PARTICLE DIAMETER 10 μm | | | | | | | | | | |
| | | | AVERAGE PARTICLE DIAMETER 15 μm | | | | | | | | | | |
| | | | AVERAGE PARTICLE DIAMETER 45 μm | | | | | | | | | | |
| | INORGANIC FILLER | BARIUM SULFATE | PRECIPITATED | 15 | 25 | 30 | 30 | | | 25 | 10 | 20 | |
| | | 0.5–1.5 μm | SIEVED (98%) | | | | | 25 | 25 | | | | |
| | | | SIEVED (95%) | | | | | | 25 | | | | |
| | | | SIEVED (80%) | | | | | | | 25 | | | 25 |
| | | 10 μm | SIEVED (98%) | 15 | 25 | 10 | 20 | 25 | | | 30 | 30 | 25 |
| | | CALCIUM HYDROXIDE | | 3 | 3 | 3 | 3 | 3 | 3 | 3 | 3 | 3 | 3 |
| | | TITANIC ACID SALT | | 6 | 6 | 6 | 6 | 6 | 6 | 6 | 6 | 6 | 6 |
| | | ANTIMONY SULFIDE | | 3 | 3 | 3 | 3 | 3 | 3 | 3 | 3 | 3 | 3 |
| | | ZIRCONIA COMPOUND | | 2 | 2 | 2 | 2 | 2 | 2 | 2 | 2 | 2 | 2 |
| | | MICA | | 5 | 5 | 5 | 5 | 5 | 5 | 5 | 5 | 5 | 5 |
| | | CALCIUM SILICATE | | 8 | 0 | 5 | 0 | 0 | 0 | 0 | 5 | 0 | 0 |
| | | CALCIUM CARBONATE | | 7 | 0 | 4 | 0 | 0 | 0 | 0 | 4 | 0 | 0 |
| | | OTHERS | | 4 | 0 | 0 | 0 | 0 | 0 | 0 | 0 | 0 | 0 |
| PERFORMANCE | GENERAL EFFECTIVENESS | | 50kph | ○ | ○ | ○ | ○ | ○ | ○ | × | ○ | ○ | × |
| | WEARING PROPERTIES | | 100kph | ○ | ○ | ○ | ○ | ○ | ○ | ○ | ○ | ○ | ○ |
| | | | 200°C | ○ | ○ | ○ | ○ | ○ | ○ | △ | ○ | ○ | △ |
| | | | 300°C | ○ | ○ | ○ | ○ | ○ | ○ | △ | ○ | ○ | △ |
| | | | 400°C | ○ | ○ | ○ | ○ | ○ | ○ | ○ | ○ | ○ | ○ |
| | NOISE | | SQUEAL | ○ | ○ | ○ | ○ | ○ | ○ | × | ○ | ○ | × |
| | | | STRANGE NOISE | ○ | ○ | ○ | ○ | ○ | ○ | × | × | × | × |
| | | | CREEPING NOISE | ○ | ○ | ○ | ○ | ○ | ○ | × | ○ | × | × |
| | MATING-MATERIAL ATTACKING PROPERTIES | | | ○ | ○ | ○ | ○ | ○ | ○ | × | ○ | ○ | × |

FRICTION MATERIAL

TECHNICAL FIELD

The present invention relates to a friction material used for a brake device or the like for vehicles.

BACKGROUND ART

The friction material used for brake pads, brake shoes of vehicles and the like is required to have various characteristics such as prevention of noise generation, high effectiveness (high friction coefficient), long lifespan (wear resistance) and the like. In particular, the generation of noise causes discomfort or anxiety to the user, and hence improvement is desired.

For example, regarding noise generated at the time of brake braking, low-frequency noise, so-called creep noise, is an unpleasant noise generated when torque is generated in the advancing direction due to the creep phenomenon at the start of the automatic (AT) vehicle, and the vibration generated with change in the relative speed between the friction material and its mating material (e.g., rotor) is transmitted to the suspension and the vehicle body and diverged. It is known that creep noise is also generated in manual (MT) vehicle when the brake is released while the service brake is stopped on a downhill.

The generation of creep noise is related to the stick-slip phenomenon that occurs on the friction surface between the friction material and the mating material. Specifically, by repeating the brake braking, wear powder generated by friction of the friction material with the mating material and decomposition product of the wear powder adhere to the surface of the mating material to form a film. When the film grows to an excessive thickness or size, the brake torque is greatly lost when the film is broken. As a result, it is considered that the stick-slip phenomenon increases and the creep noise occurs.

Therefore, an attempt has been made to form a friction material that can reduce the generation of creep noise without increasing the wear of the mating material. For example, Patent Literature 1 reports that generation of creep noise can be effectively reduced without increasing the wear of the mating material by using a layered mineral and using barium sulfate (sieved barium sulfate) having a sufficiently large particle size as at least a part of the filler of the friction material.

CITATIONS LIST

Patent Literature

Patent Literature 1: Japanese Unexamined Patent Application Publication No. 11-61105
Patent Literature 2: Japanese Unexamined Patent Application Publication No. 2012-255052

SUMMARY OF INVENTION

Technical Problems

Conventionally, like the friction material described in Patent Literature 1, a copper component having high thermal conductivity and excellent spreadability has been included in the friction material in order to maintain the stability of the friction coefficient and the wear resistance. However, nowadays environmental concerns are increasing on a global scale, and development of friction materials (copper-free) with reduced copper components of high environmental load is urgently needed. On the other hand, a friction material that does not contain a copper component has difficulty in obtaining the same friction properties and wear resistance as a friction material that contains a copper component, and thus there is room for improvement.

Therefore, in order to compensate for the deterioration of wear resistance accompanying the reduction of the copper component, for example, as shown in Patent Literature 2, a friction material containing a large amount of titanic acid salt such as potassium titanate (10 to 35 wt %) has been proposed. When a large amount of titanic acid salt is contained, the wear resistance at high temperature is excellent, but the formation of a transfer film on the mating material increases. As a result, the film formed of a large amount of titanic acid salt becomes too thick, and the film may crack and partially peel off during brake braking. Therefore, the contact between the friction material and the mating material is not stable, the friction coefficient of the friction material becomes unstable, and unpleasant noise such as the above-mentioned creep noise may occur.

Furthermore, not only the low frequency noise, and improvement is also desired on the high frequency noise. It is also known that when the brake is braked after being left in a relatively low temperature and high humidity environment such as during the rainy season or early morning, the effect becomes abnormally high and the impact becomes large, causing a brake squeal. These phenomena are caused by the fact that the wear powder of the friction material absorbs and aggregates moisture, thereby increasing the true contact area between the friction material and the rotor. Conventionally, like the friction material described in Patent Literature 1, it was dealt with by containing a copper component in the friction material, and appropriately roughening the rotor surface while mixing the wear powder with the copper component to reduce the true contact area and suppress the brake squeal. However, due to the reduction of the copper component, the effect described above from the copper component cannot be expected, and the brake squeal is likely to occur due to an abnormal increase in effectiveness.

In view of the above circumstances, it has been desired to provide a friction material having excellent performance that can deal with a copper-free flow and that can effectively suppress the generation of noise. Therefore, it is an object of the present invention to provide a friction material capable of reducing the generation of unpleasant noise such as brake squeal and creep noise while ensuring excellent braking force and wear resistance at the time of brake braking.

Solutions to Problems

The inventors of the present invention have conducted intensive research to solve the above problems, and constructed a friction material containing as a lubricating material, graphite of a predetermined particle diameter or smaller, and barium sulfate of a predetermined particle diameter or smaller and a predetermined purity or higher. According to such a friction material, the inventors have found that the generation of unpleasant noise such as brake squeal and creep noise can be reduced while ensuring excellent braking force and wear resistance at the time of brake braking even without substantially containing a copper component, and came to complete the present invention.

That is, the present invention provides a friction material having the following characteristic configuration.

A friction material containing a fibrous base, a binder, a lubricating material, an organic filler, and an inorganic filler, where in the friction material, contained amount of copper as an element is 0.5 wt % or less with respect to a whole of the friction material; graphite having an average particle diameter of 10.0 µm or smaller is contained as the lubricating material; and barium sulfate is contained as the inorganic filler, the barium sulfate containing small-diameter barium sulfate having an average particle diameter of 1.5 µm or smaller and a purity of 95.0% or higher.

According to the configuration described above, the friction material having an excellent performance that can reduce the generation of unpleasant noise such as brake squeal and creep noise while ensuring excellent braking force and wear resistance at the time of brake braking can be provided. The friction material having the present configuration is also applied to the copper-free flow. Therefore, even in friction materials containing titanic acid as an alternative to the copper component, by containing graphite having a predetermined average particle diameter, the wear resistance of the friction material can be increased and the fluctuation of the friction coefficient can be suppressed to stabilize the effect by the lubricity thereof. In addition, lubricity is given to the wear powder itself, the wear powder can be effectively discharged from the sliding surface between the friction material and the mating material, the aggregation of the wear powder is suppressed even in the presence of moisture, and the generation of brake squeal can be suppressed. In addition, the excessive formation of the transfer film can be suppressed, and the generation of unpleasant noise such as brake squeal and creep noise can be reliably reduced by containing the small-diameter barium sulfate of a predetermined average particle diameter or smaller and a predetermined purity or higher.

BRIEF DESCRIPTION OF DRAWINGS

FIG. 1 is a view summarizing a composition of a friction material raw material and the performance evaluation thereof according to a first example and comparative examples of a friction material in accordance with the present embodiment.

FIG. 2 is a view summarizing a composition of a friction material raw material and the performance evaluation thereof according to a second example and comparative examples of a friction material in accordance with the present embodiment.

DESCRIPTION OF EMBODIMENTS

Hereinafter, although an embodiment of the present invention is described in detail, the present invention is not limited by the following embodiment to an extent not exceeding its purpose.

A friction material according to the present embodiment contains a fibrous base, a binder, a lubricating material, an organic filler, an inorganic filler, and the like, which will be described later; contains graphite having an average particle diameter in a predetermined range as the lubricating material; and contains barium sulfate having an average particle diameter in a predetermined range and having a purity in a predetermined range as an inorganic filler. In addition to these, materials generally used in producing the friction material can also be contained. Here, all the materials mixed in producing the friction material according to the present embodiment are referred to as a friction material raw material.

The friction material according to the present embodiment is preferably a non-asbestos-based friction material (NAO material). Furthermore, the friction material according to the present embodiment does not substantially contain a copper component having a high environmental load (copper-free). Specifically, the copper component is not contained, or even when contained, it is at most 0.5 wt % with respect to the whole of the friction material raw material.

However, nowadays, environmental concerns are increasing on a global scale, and development of friction materials with reduced copper components of high environmental load is urgently needed. Therefore, the friction material according to the present embodiment which does not substantially contain a copper component sufficiently corresponds to the movement of copper-free.

The fibrous base can be exemplified by organic fibers, metal fibers, natural or synthetic inorganic fibers, and the like. Specific examples of the fibrous base include, as organic fibers, aromatic polyamide fibers (aramid fibers), acrylic fibers, cellulose fibers, carbon fibers, and the like. Examples of metal fiber include pure metals such as steel, stainless steel, aluminum, zinc, and tin, and fibers made of respective alloy metals. Examples of inorganic fiber include rock wool, glass fiber and the like. The fibrous base may be used alone or in combination of two or more types. Furthermore, the contained amount of the fibrous base is not particularly limited, but it can be contained preferably in an amount of 3.0 to 15.0 wt % with respect to the whole of the friction material raw material.

The binder has a function of binding the friction material raw materials. Specific examples of the binder include phenolic resin, epoxy resin, melamine resin, and imide resin, and modified resins thereof such as elastomer, hydrocarbon resin, and epoxy can also be used. A binder can also be used alone or in combination of two or more types. Furthermore, the contained amount of the binder is not particularly limited, but it can be contained preferably in an amount of 3.0 to 10.0 wt % with respect to the whole of the friction material raw material.

Graphite (black lead) having an average particle diameter in a predetermined range can be contained as the lubricating material. Graphite can improve the wear resistance of the friction material due to its lubricity, and can suppress the fluctuation of the friction coefficient and stabilize the effect. In addition, lubricity is given to the wear powder itself, the wear powder can be effectively discharged from the sliding surface between the friction material and the mating material, the aggregation of the wear powder is suppressed even in the presence of moisture, and an increase in the true contact area between the friction material and the mating material can be suppressed.

Graphite (black lead) is a layered crystal structure composed of carbon atoms in which a planar structure in which carbon atoms are bonded in a hexagonal network is formed, and such planar structures are stacked. As the graphite, any of natural graphite and artificially synthesized artificial graphite disclosed in Japanese Laid-Open Patent Publication No. 2016-79252 and the like may be used, but artificial graphite is preferable. Moreover, a combination of both may be used.

The average particle diameter of the graphite is 10.0 µm or smaller, and preferably 6.0 µm or smaller. Here, the average particle diameter means a 50% diameter obtained from the volume distribution of the particle size distribution (hereinafter, the same definition will be applied when expressed as "average particle diameter"). Many of the conventional friction materials containing graphite have an average particle diameter of several μm to several hundred μm. However, if the average particle diameter of the graphite exceeds 10.0 μm, aggregation of wear powders cannot be effectively suppressed, and generation of noise such as brake squeal and creep noise cannot be suppressed.

The contained amount of graphite is preferably 3.0 wt % or more and 6.0 wt % or less with respect to the entire friction material raw material. If the graphite is contained exceeding 6.0 wt %, the braking force during the brake braking is reduced, which is not preferable. On the other hand, when the contained amount is less than 3.0 wt %, the above-mentioned characteristics cannot be effectively exhibited, and hence the contained amount is preferably within the range of the above-mentioned wt %.

As the lubricating material, various compounds can be contained, as required, other than the graphite. Examples thereof include, for example, coke, carbon black, metal sulfide, and the like. Examples of metal sulfides include tin sulfide, antimony trisulfide, molybdenum disulfide, tungsten sulfide, and the like. The lubricating material may be used alone or in combination of two or more types. The contained amount of these lubricating materials is not particularly limited, and can be a contained amount that is normally used in the technical field but it is preferable to appropriately set the contained amount according to the contained amount of the graphite.

The organic filler can contain cashew dust, rubber powder, tire powder, fluoropolymer and the like, which can be used alone or in combination of two or more types. However, the present invention is not limited to the specific examples described above, and organic fillers known in the technical field can be preferably used. The contained amount of the organic filler is also not particularly limited, and may be a contained amount generally used in the technical field.

The inorganic filler contains barium sulfate having a high purity and a relatively small average particle diameter (referred to as "small-diameter barium sulfate"). The discharge property of the wear powder can be improved and excessive formation of the transfer film can be suppressed by containing small-diameter barium sulfate.

The small-diameter barium sulfate, together with graphite, can effectively discharge wear powder from the sliding surface between the friction material and the mating material, and can also suppress the aggregation of the wear powder even in the presence of moisture and suppress the increase in the true contact area between the friction material and the mating material. The generation of noises, such as a brake squeal, thus can be effectively suppressed.

The average particle diameter of the small-diameter barium sulfate is 1.5 μm or smaller. When the average particle diameter is larger than 1.5 μm, the discharge property of the wear powder is lowered, excessive formation of the transfer film cannot be suppressed, and generation of noise such as brake squeal and creep noise cannot be suppressed, which is not preferable.

The purity of the small-diameter barium sulfate can be 95.0% or higher and preferably 98.0% or higher. Here, purity is the mass concentration of barium sulfate excluding impurities contained in the particles (hereinafter, the same definition will be applied when expressed as "purity"). When the purity of barium sulfate is less than 95.0%, the mixing ratio of substances having high Mohs hardness such as aluminum oxide, which is an impurity, increases, and the attaching properties to the rotor, which is the mating material, increases. As a result, the wear of the mating material deteriorates and the generation of noise such as brake squeal cannot be suppressed.

Here, barium sulfate is classified into sieved barium sulfate produced by pulverizing barite, and precipitated barium sulfate produced by mixing an aqueous solution of a soluble barium compound such as barium sulfide or barium chloride with an aqueous solution of a sulfate compound such as sodium sulfate and precipitating by chemical reaction. In the present embodiment, any small-diameter barium sulfate can be used as long as it has an average particle diameter 1.5 μm or smaller and a purity of 95.0% or higher. Preferably, precipitated barium sulfate is used.

In addition to the small-diameter barium sulfate described above, barium sulfate having a relatively large average particle diameter (hereinafter referred to as "large-diameter barium sulfate") is contained as the inorganic filler. The specific surface area is reduced by containing the large-diameter barium sulfate. Thus, the binder spreads over the entire friction material raw material thus enhancing adhesion, imparting strength to the friction material, and improving moldability and wear resistance.

Here, the average particle diameter of the large-diameter barium sulfate exceeds 1.5 μm, which is larger than that of the small-diameter barium sulfate, and preferably the average particle diameter of the large-diameter barium sulfate is 6.0 μm or greater and 12.0 μm or smaller. Regarding the purity of the large-diameter barium sulfate, it is preferable that it has a purity of 95.0% or higher, like the small-diameter barium sulfate.

The contained amount of barium sulfate is preferably 30.0 wt % or more and 50.0 wt % or less with respect to the whole of the friction material raw material. If the contained amount exceeds 50.0 wt %, the strength of the friction material is lowered, and moldability and wear resistance are deteriorated, which is not preferable. On the other hand, if the contained amount is less than 30.0 wt %, the function of enhancing the discharge property of the wear powder described above cannot be exhibited effectively, and the generation of noise cannot be suppressed, and hence the contained amount is preferably within the range of the above-mentioned wt %.

The barium sulfate preferably contains more small-diameter barium sulfate than large-diameter barium sulfate. Particularly preferably, the contained amount of the large-diameter barium sulfate is preferably 10.0 wt % or more and 25.0 wt % or less with respect to the whole of the friction material raw material. By adjusting the content ratio of the large-diameter barium sulfate within this range, an appropriate strength can be imparted to the friction material, good moldability and wear resistance can be ensured, and generation of noise such as brake squeal and creep noise can be effectively suppressed. In particular, when the content ratio of the large-diameter barium sulfate is too large, the generation of brake squeal cannot be effectively suppressed and thus it is preferable that the contained amount does not exceed the contained amount of the small-diameter barium sulfate.

In addition to barium sulfate, various inorganic matters known in the technical field can be contained, as necessary, as the inorganic filler.

For example, titanic acid salt can be contained. Examples of titanic acid salt includes titanic acid alkali metal salt, titanic acid alkali metal/group II salt, and the like, and specific examples thereof include potassium titanate, sodium titanate, lithium titanate, lithium potassium titanate, magnesium potassium titanate and the like. The titanic acid salt is preferably contained in an amount of 5.0 wt % or more and 20.0 wt % or less, preferably 5.0 wt % or more and 10.0 wt % or less with respect to the whole of the friction material raw material. This can compensate for the deterioration of the wear resistance due to the reduction of the copper component.

Furthermore, calcium hydroxide and the like can be contained as a pH adjusting material.

An inorganic friction adjusting material for adjusting the friction characteristic of a friction material may be further contained. It is preferable to adjust the contained amount, the Mohs hardness and the like as appropriate so that the attaching properties to the mating material does not become too high. As the inorganic friction adjusting material, a substance having a Mohs hardness of 6.5 or greater can be used, and for example, it may be silica such as silicon dioxide, zirconium silicate, zirconium oxide (zirconia), aluminum oxide (alumina), chromium oxide (chromium oxide (II), etc.), ceramic powder, and the like, and may further contain iron oxide, magnesium oxide, and the like.

In addition, pure metals such as iron (steel), aluminum, zinc and tin, and metals other than copper such as metal powder and metal fiber of respective alloy metals can be contained as needed, and the strength of the friction material can be enhanced. However, metal such as metal powder and metal fiber is not an essential component of the friction material and does not necessarily need to be contained from the viewpoint of cost reduction and the like.

Moreover, mica, talc, kaolin, vermiculite and the like may be contained.

These inorganic fillers may be used alone or in combination of two or more types. The contained amount of the inorganic filler is also not particularly limited, and may be a contained amount generally used in the technical field.

The friction material of the present embodiment can be manufactured through a method known in the technical field, and can be manufactured by a mixing process of compounding and mixing the friction material raw material and a molding process of molding the mixed friction material raw material into a desired shape.

Here, in the mixing process, the friction material raw material is preferably mixed in powder form, so that the friction material raw material can be uniformly mixed easily. The mixing method is not particularly limited as long as the friction material raw material can be uniformly mixed, and the mixing can be carried out through methods known in the technical field. Preferably, mixing can be performed using a mixer such as a Henschel mixer or a Loedige mixer, and for example, mixing is performed for about 10 minutes at normal temperature. At this time, the friction material raw material may be mixed while being cooled through a known cooling method so that the temperature of the mixture does not rise.

The molding process can be performed by pressing and solidifying the friction material raw material with a press or the like, and can be performed based on methods known in the technical field. When performing molding with a press, the molding may be performed through either a hot press method in which the friction material raw material is molded by being heated, pressed and solidified, or a normal temperature press method in which the friction material raw material is molded by being pressed and solidified at normal temperature without being heated. In a case where the molding is performed through the hot press method, for example, the molding temperature is 140° C. to 200° C. (preferably 160° C.), the molding pressure is 10 MPa to 30 MPa (preferably 20 MPa), and the molding time is 3 minutes to 15 minutes (preferably 10 minutes). In a case where the molding is performed through the normal temperature press method, for example, molding can be performed by setting the molding pressure to 50 MPa to 200 MPa (preferably 100 MPa) and the molding time to 5 seconds to 60 seconds (preferably 15 seconds). Subsequently, clamp process (e g, 180° C., 1 MPa, 10 minutes) is performed. Thereafter, heat treatment (preferably 230° C. 3 hours) can be performed at 150° C. to 250° C. for 5 minutes to 180 minutes.

Furthermore, a polishing process may be provided to polish the surface of the friction material to form a friction surface, if necessary.

The friction material according to the present embodiment can be applied to a disc brake pad of a vehicle or the like, but is not limited thereto, and can be applied to any object to which a friction material known in the technical field can be applied such as a brake shoe. For example, the friction material according to the present embodiment can be integrated with a plate-like member such as a metal plate serving as a back plate and used as a brake pad.

According to the friction material of the present embodiment, a friction material having excellent performance capable of effectively suppressing the generation of noise while ensuring sufficient braking force and wear resistance at the time of brake braking can be provided. The friction material of the present embodiment is also adapted to the copper-free flow. Therefore, even in friction materials containing titanic acid as an alternative to the copper component, by containing graphite having a predetermined average particle diameter, the wear resistance of the friction material can be increased and the fluctuation of the friction coefficient can be suppressed to stabilize the effect by the lubricity thereof. In addition, lubricity is given to the wear powder itself, the wear powder can be effectively discharged from the sliding surface between the friction material and the mating material, the aggregation of the wear powder is suppressed even in the presence of moisture, and an increase in the true contact area between the friction material and the mating material can be suppressed. In addition, it becomes possible to improve the discharge property of wear powder while suppressing the attaching properties to the mating material by containing the small-diameter barium sulfate having a predetermined average particle diameter or smaller and having a predetermined purity or higher, and generation of unpleasant noise such as brake squeal and creep noise can be reduced by suppressing excessive formation of the transfer film.

EXAMPLES

Examples of the friction material according to the present embodiment will be described below, but the present invention is not to be limited to these examples.

First Example

Figure 1:
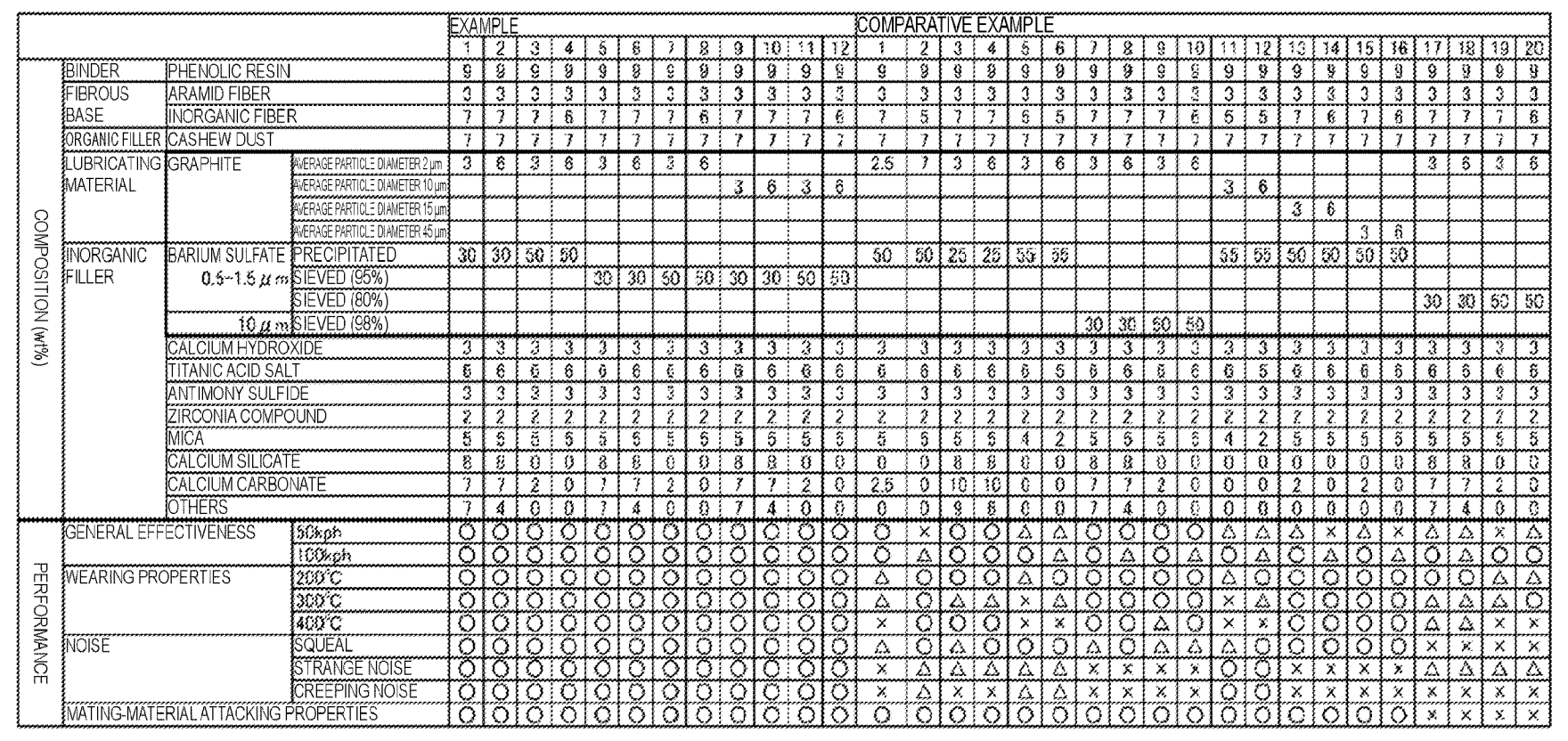

In Examples 1 to 12 and Comparative Examples 1 to 20, the friction material prepared by compounding the friction material raw material according to the compounding amount shown in FIG. 1 was used in a brake pad, and general effectiveness, wearing properties, noise generation and mating-material attacking properties were evaluated. In the present example, the small-diameter barium sulfate is necessarily contained as barium sulfate, and in the comparative example, either the small-diameter barium sulfate or the large-diameter barium sulfate is contained. The unit of compounding amount in the composition of each friction material raw material in the figure is wt % with respect to the whole of the friction material raw material.

A. General Effectiveness Test, Mating-Material Attacking Properties
(Test Conditions)
Measured according to JASO C406. In the second effectiveness test, the average friction number (μ) and the wear amount of the mating material (μm) at an initial speed of 50 km/h and 100 km/h were measured.
(Evaluation)
The average friction number (μ) was evaluated in three stages according to the following criteria.
○: Average friction coefficient is 0.37μ or greater and 0.43μ or less
Δ: Average friction coefficient is 0.34μ or greater and less than 0.37μ, or Greater than 0.43μ and 0.46μ, or less
x: Average friction coefficient is less than 0.34μ or greater than 0.46 μ

With the wear amount of the mating material (mm), the mating-material attacking properties were evaluated in two stages according to the following criteria.
○: Wear amount is 20 μm or smaller
x: Wear amount is greater than 20 μm B. Friction Properties
(Test Conditions)
The wear test was performed at each temperature of 200° C., 300° C., and 400° C. according to JASO C427, the thickness (mm) of the friction material was measured, and the wear amount was calculated.
(Evaluation)
After conversion to the wear amount per 1000 braking cycles, the wear amount (mm) was evaluated in three stages according to the following criteria.
⊚: Less than 0.2 mm
○: 0.2 mm or greater and less than 0.25 mm
Δ: 0.25 mm or greater and less than 0.30 mm
x: 0.30 mm or greater C. Noise
C-1. Squeal/Strange Noise
(Test Conditions)
Sliding contact: Initial speed 60 km/h, deceleration 0.35 G, 200 times
Speed: Matrix by temperature: 0.1 to 0.4 G (0.1 G pitch)×20, 40, 60 km/h×50 to 200° C. (50° C. pitch), each braking once
(Evaluation)
The squeal/strange noise was evaluated in three stages according to the following criteria.
○: Squeal/strange noise is not generated or is generated at slight rubbing sound level
Δ: Squeal/strange noise is generated at a level it can be heard slightly, but it is acceptable level
x: Squeal/strange noise is generated that can be heard clearly regardless of surrounding sound, or sound pressure is unpleasant C-2. Creep Noise
Using the actual vehicle, the sliding equivalent to JASO C406 was performed, and thereafter it was left outdoors for one night. The next morning, the brake was released immediately after the engine was started, and the in-vehicle sound pressure of the generated creep noise was evaluated.
(Evaluation)
The creep noise was evaluated in three stages according to the following criteria.
○: Creep noise is not generated or is generated at slight sound pressure
Δ: Creep noise is generated, but sound pressure is acceptable level
x: Creep noise is generated and sound pressure is unpleasant The results are shown in FIG. 1. In Examples 1 to 12, good results were obtained in all of general effectiveness, friction properties, and noise. Thus, it was found that the friction material of the present example can effectively suppress the generation of the noise while securing satisfactory brake effect and the wear resistance of the friction material. In Examples 1 to 4, precipitated barium sulfate was contained, and in Examples 5 to 12, sieved barium sulfate was contained, but as similar excellent properties were recognized in all cases, it can be understood that there is no limit to the method for producing barium sulfate.

In Comparative Example 1 in which the content ratio of graphite was as low as 2.5 wt %, deterioration of wearing properties and generation of noise were recognized. In Comparative Example 2 in which the content ratio of graphite was as high as 7.0 wt %, deterioration of general effectiveness was recognized. From this result, it can be understood that it is necessary to appropriately control the content ratio of the graphite in order to construct a friction material that exhibits excellent properties in terms of satisfactory general effectiveness, wear resistance, and suppression of noise generation.

In Comparative Examples 3 and 4 in which the content ratio of the small-diameter barium sulfate was as low as 25.0 wt %, the generation of creep noise was recognized. On the other hand, in Comparative Examples 5 and 6 in which the content ratio of small-diameter barium sulfate was as high as 55.0 wt %, deterioration of wearing properties was recognized, and the general effectiveness was also deteriorated. Even in a case where the average particle diameter of the graphite was increased to 10 μm as in Comparative Examples 11 and 12, deterioration of the wearing properties was recognized when the content ratio of the small-sized barium sulfate was high. From these results, it can be understood that it is necessary to appropriately control the content ratio of the small-diameter barium sulfate in order to construct a friction material that exhibits excellent properties in terms of satisfactory general effectiveness, wear resistance, and suppression of noise generation. Furthermore, in Comparative Examples 7 to 10 in which large-diameter barium sulfate having an average particle diameter of 10.0 μm is contained instead of small-diameter barium sulfate, generation of brake squeal and strange noise, and creep noise was recognized. From these results, it is possible to understand the importance of appropriately controlling the content ratio of the small-diameter barium sulfate.

In Comparative Examples 13 to 14 and 15 to 16 in which the average particle diameter of graphite was increased to 15 μm and 45 μm, generation of noise such as strange noise and creep noise was recognized, and general effectiveness was also deteriorated. Therefore, it can be understood that it is necessary to appropriately control the average particle diameter of the graphite in order to construct a friction material that exhibits excellent properties in terms of satisfactory general effectiveness, wear resistance, and suppression of noise generation.

In Comparative Examples 17 to 20 in which the purity of small-diameter barium sulfate is as low as 80%, general effectiveness, wear resistance at high temperature, and mating-material attacking properties deteriorate, and the generation of noise such as brake squeal and creep noise was recognized. Therefore, it can be understood that it is necessary to make the purity of the small-diameter barium sulfate high and in particular, to make the content ratio of hard contaminants as small as possible in order to construct a friction material that exhibits excellent properties in terms of satisfactory general effectiveness, wear resistance, and suppression of noise generation.

Second Example

In Examples 1 to 6 and Comparative Examples 1 to 4, the friction material prepared by compounding the friction material raw material according to the compounding amount shown in FIG. 2 was used in a brake pad, and general effectiveness, wearing properties, noise generation and mating-material attacking properties were evaluated. In this example, as barium sulfate, small-diameter barium sulfate and large-diameter barium sulfate are contained, or small-diameter barium sulfate having a different production method is contained. The unit of compounding amount in the composition of each friction material raw material in the figure is wt % with respect to the whole of the friction material raw material.

Tests were conducted and evaluated similar to the first example for A. General effectiveness test, mating-material attacking properties, B. Friction properties, and C. Noise.

The results are shown in FIG. 2. In Examples 1 to 6, good results were obtained in all of general effectiveness, friction properties, and noise. In detail, in Examples 1 to 4, precipitated small-diameter barium sulfate and sieved large-diameter barium sulfate were contained, in Example 5, sieved small-diameter barium sulfate and large-diameter barium sulfate were contained, and in Example 6, precipitated and sieved small-diameter barium sulfate was contained, but the similar excellent properties were recognized in all cases. Thus, it was found that the friction material of the present example can effectively suppress the generation of the noise while securing satisfactory brake effect and the wear resistance of the friction material.

In Comparative Examples 1 and 4 in which a small-diameter barium sulfate having a purity as low as 80% was contained, the general effectiveness and the mating-material attacking properties deteriorate, and generation of noise such as brake squeal, strange noise, and creep noise was recognized. Therefore, it can be understood that it is necessary to make the purity of the small-diameter barium sulfate high and in particular, to make the content ratio of hard contaminants as small as possible in order to construct a friction material that exhibits excellent properties in terms of satisfactory general effectiveness, wear resistance, and suppression of noise generation.

In Comparative Examples 2 and 3 in which a larger amount of large-diameter barium sulfate than a small-diameter barium sulfate was compounded, generation of strange noise and creep noise was recognized. Therefore, it can be understood that it is necessary to compound a larger amount of large-diameter barium sulfate than the small-diameter barium sulfate in order to construct a friction material that exhibits excellent properties in terms of satisfactory general effectiveness, wear resistance, and suppression of noise generation.

INDUSTRIAL APPLICABILITY

The friction material of the present invention can be applied to a field where a friction material is required, such as a disk brake pad or a brake shoe for a vehicle.

The invention claimed is:
1. A friction material comprising:
a fibrous base;
a binder;
a lubricating material;
an organic filler; and
an inorganic filler, wherein
in the friction material, a contained amount of copper as an element is 0.5 wt % or less with respect to a whole of the friction material,
graphite having an average particle diameter of 10.0 μm or smaller is contained as the lubricating material, and
barium sulfate is contained as the inorganic filler, the barium sulfate containing small-diameter barium sulfate having an average particle diameter of 1.5 μm or smaller and a purity of 95.0% or higher.
2. The friction material according to claim 1, wherein the barium sulfate further includes a large-diameter barium sulfate having an average particle diameter exceeding 1.5 μm, and a content ratio of the large-diameter barium sulfate is lower than that of the small-diameter barium sulfate.
3. The friction material according to claim 1, wherein a contained amount of the barium sulfate is 30.0 wt % or more and 50.0 wt % or less with respect to the whole of the friction material.
4. The friction material according to claim 1, wherein a contained amount of the graphite is 3.0 wt % or more and 6.0 wt % or less.
5. The friction material according to claim 2, wherein a contained amount of the barium sulfate is 30.0 wt % or more and 50.0 wt % or less with respect to the whole of the friction material.
6. The friction material according to claim 2, wherein a contained amount of the graphite is 3.0 wt % or more and 6.0 wt % or less.
7. The friction material according to claim 5, wherein a contained amount of the graphite is 3.0 wt % or more and 6.0 wt % or less.
8. The friction material according to claim 3, wherein a contained amount of the graphite is 3.0 wt % or more and 6.0 wt % or less.

* * * * *